United States Patent [19]
Langenbeck et al.

[11] Patent Number: 4,711,357
[45] Date of Patent: Dec. 8, 1987

[54] AUTOMATED SYSTEM AND METHOD FOR TRANSPORTING AND SORTING ARTICLES

[75] Inventors: Keith A. Langenbeck, 3112 Purdue St., Dallas, Tex. 75225; David A. Holdeman, Highland, Ill.

[73] Assignee: Keith A. Langenbeck, Dallas, Tex.

[21] Appl. No.: 810,885

[22] Filed: Dec. 18, 1985

Related U.S. Application Data

[63] Continuation of Ser. No. 644,554, Aug. 27, 1984, abandoned.

[51] Int. Cl.⁴ .............................................. B07C 5/36
[52] U.S. Cl. ................................... 209/565; 198/367; 209/652; 209/900
[58] Field of Search ............... 209/651, 654, 652, 702, 209/900, 942, 564, 565, 566, 583, 584, 569; 198/367, 370, 572, 598, 835; 414/134, 136; 364/478; 377/1, 77

[56] References Cited

U.S. PATENT DOCUMENTS

| | | | |
|---|---|---|---|
| 1,204,428 | 11/1916 | Grandfield | 209/900 |
| 1,992,686 | 2/1935 | Anderson | 209/3.3 |
| 3,104,755 | 9/1963 | Zuercher | 198/367 |
| 3,141,540 | 7/1964 | Burkhardt | 209/900 |
| 3,438,489 | 4/1969 | Cambomac et al. | 209/900 |
| 3,462,000 | 8/1969 | Bachman | 198/367 |
| 3,543,916 | 12/1970 | Berk | 198/367 |
| 3,743,090 | 7/1973 | Brown et al. | 209/566 |
| 3,889,811 | 6/1975 | Yoshimura | 209/900 |
| 4,142,636 | 3/1979 | Planke | 198/367 |
| 4,173,274 | 11/1979 | Kantarian et al. | 198/367 |
| 4,181,947 | 1/1980 | Krauss et al. | 209/942 |
| 4,364,465 | 12/1982 | Kraft et al. | 198/598 |

FOREIGN PATENT DOCUMENTS

| | | | |
|---|---|---|---|
| 2442028 | 3/1975 | Fed. Rep. of Germany | 198/835 |
| 2062566 | 5/1981 | United Kingdom | 209/654 |

*Primary Examiner*—David A. Scherbel
*Assistant Examiner*—Donald T. Hajec
*Attorney, Agent, or Firm*—W. Kirk McCord

[57] ABSTRACT

An automated system and method for transporting and sorting various types of articles, such as parcels and sacks of mail. The system is comprised of a primary conveyor track and a plurality of secondary conveyor tracks which intersect the primary conveyor track at selected locations therealong. Each secondary track has associated therewith a diverter mechanism for diverting selected articles from the primary track to a corresponding secondary track, depending upon the final destinations of the articles. The diverter mechanism includes a diverter arm, which pivots across the primary track to divert selected articles to the corresponding secondary track. The deflecting surface of the diverter arm includes a motor-driven belt, the bottom edge of which is positioned within ¼ inch of the surface of the track so that articles of irregular shape, such as sacks of mail, do not become trapped between the bottom edge of the diverter arm and the track. A plurality of photoelectric eyes are disposed at selected positions along the primary track and the secondary tracks for detecting the passage of individual articles. Each diverter arm is operated asynchronously so that the diverter arm is moved to the "divert" position in advance of the arrival of the article to be diverted, thereby enhancing the speed of operation of the system.

9 Claims, 10 Drawing Figures

AUTOMATED SYSTEM AND METHOD FOR TRANSPORTING AND SORTING ARTICLES

This application is a continuation of application Ser. No. 644,554 filed Aug. 27, 1984, now abandoned.

BACKGROUND OF THE INVENTION

1. Field of the Invention:

This invention relates to systems for transporting and sorting articles and in particular to automated systems for transporting and sorting articles, including parcels and sacks of mail.

2. Description of the Prior Art:

Automated systems for transporting and sorting articles, such as parcels, envelopes and other postal articles, are known in the art. Such systems typically include a conveyor mechanism, such as, for example, a conveyor belt or a series of closely spaced rollers, for propelling the articles and a series of secondary tracks or chutes down which selected articles are diverted according to their respective destinations. A control system, which typically includes an optoelectric sensor for detecting the movement of the articles on the conveyor track, is provided for controlling the operation of the conveyor track and selectively activating individual ones of a plurality of diverter mechanisms located along the main conveyor track. Examples of such automated conveyor systems are shown in U.S. Pat. Nos. 2,609,928; 3,580,391; 3,651,936; 3,955,678; and 4,432,458.

Typically, at a bulk mail center where packages, which are referred to in the trade as "non-machineable outsides" or "NMO's", and sacks containing small packages and envelopes are placed on metal trays, which are attached to and transported by a continuous conveyor chain or belt. The destination of each article is entered into the control system and when an article reaches a predetermined position along the conveyor track, the metal tray tilts and the article slides down a chute into a bin corresponding to its destination. The decision to tilt a particular tray with an article down a specific chute is determined indirectly by a method known as "shaft encoding". Shaft encoding involves counting the number of revolutions made by the conveyor chain drive shaft and correlating this number to a distance traveled by the metal tray along its path. The metal trays are tilted when the appropriate number of revolutions are made that corresponds with the destination chute for the article on the tray. This type of control system requires the continual adjusting of the relationship of the shaft revolutions to the chute positions due to changes in chain length (slack), tilt response time, other mechanical wear, and signal pickup reliability. An additional problem associated with this type of conveyor mechanism is that the metal trays are not well-suited for NMO's and very large sacks and it is often difficult to properly position the NMO's and sacks at the center of the trays, which often results in instability of the articles and premature tipping of the trays if the article is loaded off-center.

Another type of conveyor system used in bulk mail centers operated by the U.S. Postal Service for NMO's is comprised of a main track of closely spaced apart rollers on which the articles are initially loaded and a plurality of secondary tracks intersecting the main track at selected locations therealong, to which selected articles are diverted. A computer-implemented control system keeps track of the relative positions of the articles on the main track and selectively operates an air cylinder which shifts a set of rollers at the intersection of the main track and the selected secondary track to divert the article to that secondary track. Because the rollers must have substantial spacing therebetween to allow the rollers to shift sufficiently to divert an article, this type of conveyor system is not suitable for transporting sacks of mail, particularly partially filled sacks of mail, which are referred to in the trade as "skins", and other articles of irregular shape, because of the likelihood of portions of such articles becoming trapped in the spacings between the individual rollers. Thus, a conveyor system is not available in the prior art which is suitable for conveying and sorting NMO's and sacks of mail of various sizes and shapes.

OBJECTS OF THE INVENTION

It is, therefore, an object of the present invention to provide an improved system and method for transporting and sorting articles.

It is another object of the invention to provide a single conveyor system which is suitable for transporting and sorting parcels and sacks of mail of various and shapes.

It is yet another object of the invention to provide an improved diverter mechanism for diverting selected articles from a main conveyor track to selected ones of a plurality of secondary conveyor tracks or chutes in an article conveyor system.

It is still a further object of the invention to provide a mechanism for effectively diverting articles of various shapes and sizes from a primary conveyor track to individual ones of a plurality of secondary conveyor tracks in an article conveyor system.

It is a further object of the invention to provide an improved computer-implemented control system for controlling the transport and sorting of articles in an article conveyor system.

SUMMARY OF THE INVENTION

These and other objects are accomplished in accordance with the present invention wherein a conveyor system for transporting and sorting articles is comprised of first track means for transporting articles in a predetermined direction; at least one second track means for transporting articles diverted thereto from the first track means; at least one controllable arm means pivotally mounted adjacent to the at least one second track means, for deflecting selected ones of said articles from the first track means to the at least one second track means, the arm means having a moveable contact surface for deflecting selected ones of the articles from the first track means to the at least one second track means; and control means for automatically operating the arm means to divert selected ones of the articles to the at least one second track means and to allow other ones of the articles to continue unimpeded along the first track means.

In one embodiment the first track means is comprised of a primary conveyor track onto which articles are placed and the at least one second track means is comprised of a plurality of secondary tracks, which intersect the primary conveyor track at respective selected locations therealong. In another embodiment the primary conveyor track and the plurality of secondary conveyor tracks are each comprised of respective first and second sets of spaced-apart, substantially parallel roller means, the rotation of which transports the articles therealong. In yet another embodiment the first conveyor track and the plurality of second conveyor tracks are comprised of respective first and second sets of conveyor belts.

In another aspect of the invention, the control means is comprised of means for entering track information into the conveyor system representing respective ones of a plurality of secondary conveyor tracks on which articles on the primary conveyor track are to be transported; means for storing such track information in the control system for each article in the sequence in which the track information is entered, the secondary conveyor tracks having associated therewith respective sequences of track information corresponding to the respective sequences in which articles arrive at the respective secondary conveyor tracks; means for detecting the presence and movement of articles on the primary conveyor track at selected locations therealong and generating respective electrical signals indicative of the movement of the articles; means for comparing track information stored in the control system for the next article in sequence to arrive at each secondary conveyor track with the identity of the respective secondary conveyor track in response to the electrical signals; and means for selectively operating the diverter means associated with a secondary conveyor track to divert the next article which arrives at that particular secondary conveyor track when the track information corresponding to the next article in sequence on the primary track corresponds to the particular secondary conveyor track and to allow the next article in sequence to pass umimpeded along the primary conveyor track when the track information corresponding to the next article in sequence does not correspond to the particular secondary conveyor track.

In a preferred embodiment the conveyor system is a system for transporting and sorting parcels and sacks of mail of various sizes and shapes. The conveyor system includes a primary conveyor track on which articles are placed for transport and a plurality of secondary conveyor tracks intersecting the primary conveyor track at selected locations therealong. Each secondary track has associated therewith a diverter arm for selectively diverting articles from the primary track to the corresponding secondary track. The contact surface of the diverter arm is comprised of at least a portion of a continuous belt, which is moveable along the major axis of the diverter arm in the direction in which an article is to be diverted, thereby enhancing the deflection of the article to the selected secondary conveyor track. The diverter arm further includes drive means for driving the continuous belt, the drive means comprising a drive drum having a substantially cylindrical shape, at least a portion of which is in substantial contact with the continuous belt; first and second snub rollers positioned adjacent to the drive drum to maintain the belt in contact therewith; and first and second take-up pulleys respectively positioned at the respective first and second ends of the arm means, to reverse the direction of movement of the continuous belt at the respective first and second ends, at least one of the take-up pulleys having adjustment means coupled thereto for maintaining a predetermined amount of tension on the belt by adjusting the distance between the first and second take-up pulleys.

The diverter arm is preferably comprised of an elongated arm pivotally mounted on the opposite side of the primary conveyor track from its associated secondary conveyor track and pivot means for selectively pivoting the elongated arm to a first position wherein the arm is in substantial alignment with the major axis of the corresponding secondary conveyor track to divert an article to the secondary conveyor track and to a second position wherein the arm is in substantial alignment with the major axis of the first conveyor track to allow the article to proceed unimpeded along the first conveyor track.

The pivot means is preferably comprised of an air-operated cylinder attached to the elongated arm and having a piston and shaft which are moveable in a reciprocating motion; a clevis joint coupled to the cylinder for translating the reciprocating motion of the cylinder to rotary motion, so that the air cylinder rotates about the clevis joint in response to the reciprocating motion of the piston and shaft; a pivot shaft extending substantially vertically through the elongated arm for allowing the arm to pivot along an axis which is substantially orthogonal to the major plane of the first conveyor track; and solenoid means coupled to a source of compressed air for shunting compressed air to one side of the piston in response to a first electrical signal and for shunting air to the opposite side of the piston in response to a second electrical signal.

The control system also preferably includes a keyboard having a plurality of user-activatable keys for entering information into the control system. Such information includes the first three digits of the zip code of the destination of each parcel and sack of mail which is placed on the primary conveyor track. First and second sets of optoelectric detectors are used to detect the movement of the parcels and mail sacks on the conveyor system. The first set of optoelectric detectors are positioned at selected locations along the primary conveyor track and adjacent to respective ones of the diverter arms, for detecting the passage of articles on the primary conveyor veyor track prior to their arrival at the respective secondary tracks. The second set of optoelectric detectors are respectively positioned at selected locations on the respective secondary tracks for detecting the passage of articles along the respective secondary tracks. Computing means is provided for comparing the track information for the next article in sequence to arrive at each of the secondary conveyor tracks with the respective identities of each of the secondary conveyor tracks and for selectively operating the respective diverter arms associated with the respective secondary conveyor tracks to divert the next article to arrive at a secondary conveyor track when the track information for that next article corresponds to the identity of that particular secondary conveyor track and to allow the next article to pass unimpeded along the primary conveyor track when the track information for the next article does not correspond to the identity of the particular secondary conveyor track, in response to electrical signals from the first and second sets of optoelectric detectors indicative of the movement of articles on the conveyor system.

The conveyor system of the present invention has the advantage of allowing the individual diverter arms associated with each of the secondary conveyor tracks to be operated asynchronously, so that each diverter arm is placed in the proper position substantially in advance of the arrival of the next article in sequence on the primary conveyor track. The contact surface of the diverter arm is comprised of at least a portion of a continuous belt, which is movable along the major axis of the diverter arm in the direction in which an article is to be diverted, thereby enhancing the deflection of the articles to the proper secondary conveyor track so that odd-shaped articles, such as "skins" do not "hang up" on the primary conveyor track or on the diverter arm. Thus, the conveyor system of the present invention is well-suited for transporting and sorting bulk mail of various sizes and shapes including NMO's, very large sacks and skins.

DETAILED DESCRIPTION OF THE PREFERRED EMBODIMENT

In the description which follows, like parts are marked throughout the specification and drawings with the same reference numerals, respectively. The drawings are not necessarily to scale and in some instances proportions may have been exaggerated in order to more clearly depict certain features of the invention.

Figure 1:
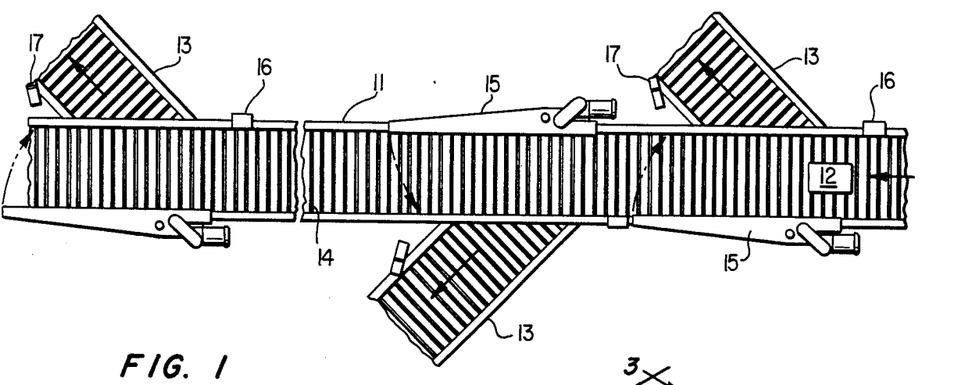
FIG. 1 is a plan view schematic of an article conveyor system embodying the present invention.

Referring now to FIG. 1 an article conveyor system in accordance with the present invention is shown. The conveyor system is comprised of a primary conveyor track 11 on which individual articles 12 are placed and a plurality of secondary conveyor tracks 13, each of which corresponds to a particular destination or set of destinations for articles 12. Primary track 11 and secondary tracks 13 are comprised of a series of parallel, spaced apart cylindrical rollers 14, each of which has a diameter of approximately 1⅜ inches and which are rotated by an electric motor or other drive mechanism (not shown) to propel articles 12 in the directions indicated by the arrow on primary track 11 and by the respective arrows on secondary tracks 13, as the case may be. The spacing between individual rollers is largely dependent upon the sizes and shapes of articles 12. The spacing must be sufficiently close (i.e. approximately 1¾ inches center-to-center spacing between adjacent rollers) to prevent irregularly shaped articles, such as, for example, "skins" in a bulk mail transporting and sorting system, from becoming caught in between the individual rollers 14.

When the conveyor system is used to transport and sort bulk mail, such as, for example, NMO's, sacks and "skins", the applicable destination code, such as, for example, the three digit zip code of the destination of each article 12 is entered into a control system (not shown) by means of a keyboard (not shown). The keyboard includes a plurality of user-activatable keys with which the operator is able to quickly enter the first three digits of the zip code destination concurrently with each article 12 being placed upon primary track 11 for transport and sorting. Each secondary track 13 preferably corresponds to one or more discrete zip code destinations so that each article 12 is diverted down the corresponding secondary track 13 in accordance with the first three digits of its destination zip code.

Each secondary track 13 has associated therewith a diverter arm 15, which is operated by the control system to divert selected articles 12 from primary track 11 to the proper secondary track 13. A plurality of first photoelectric eyes 16, are positioned on primary track 11, adjacent to respective ones of the diverter arms 15 and on the "upstream" side with respect thereto, for detecting the movement of individual articles 12 along primary track 11 as they arrive at the respective secondary tracks 13. A plurality of second photoelectric eyes 17 are respectively positioned on respective secondary tracks 13 for detecting the movement of articles 12 which have been diverted to the respective secondary tracks. First photoelectric eyes 16 and second photoelectric eyes 17 transmit respective electrical signals indicative of the movement of individual articles 12 to the control system, as will be described in greater detail hereinafter. The control system is responsive to these electrical signals for selectively activating individual ones of diverter arms 15 to pivot across primary track 11 (as indicated by the dotted arrows in FIG. 1) to divert selected articles 12 to the corresponding secondary tracks 13 when the next article 12 in sequence to arrive at a particular secondary track 13 is to be diverted to that particular secondary track 13 and alternatively, to maintain individual ones of diverter arms 15 in a "non-divert" position alongside primary track 11 when the next article 12 in sequence to arrive at a particular secondary track 13 is to remain on primary track 11.

Figure 2:
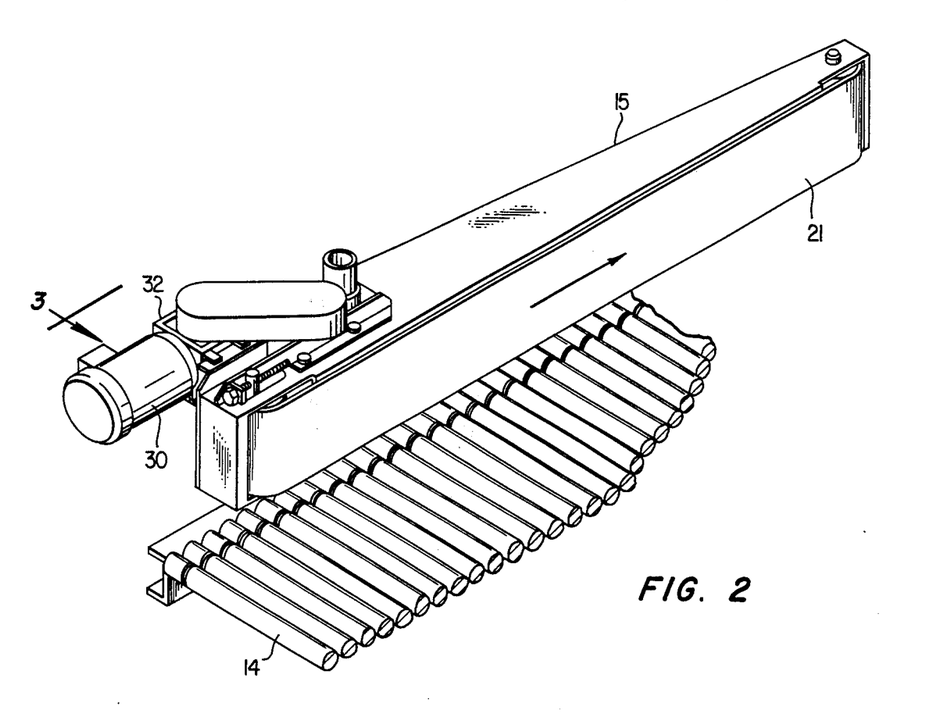
FIG. 2 is a perspective view of the front side of the diverter arm embodying the present invention.

Referring to FIG. 2, diverter arm 15 is shown in greater detail in a "non-divert" or neutral position alongside primary track 11. Diverter arm 15 has a relatively flat contact surface which, is comprised of at least a portion of a continuous belt 21, for stopping the passage of an article 12 along primary track 11 when that particular article 12 is to be diverted to a secondary track 13 and for deflecting article 12 in the direction of movement of continuous belt 21, as indicated by the arrow, to the corresponding secondary track 13, as shown in greater detail in FIGS. 4 and 5. The lowermost edge of continuous belt 21 is positioned very close to the top of primary conveyor 11 (preferably 1/16 inch to 1/32 inch clearance) to prevent articles of irregular shape from jamming underneath diverter arm 15.

Figure 3:
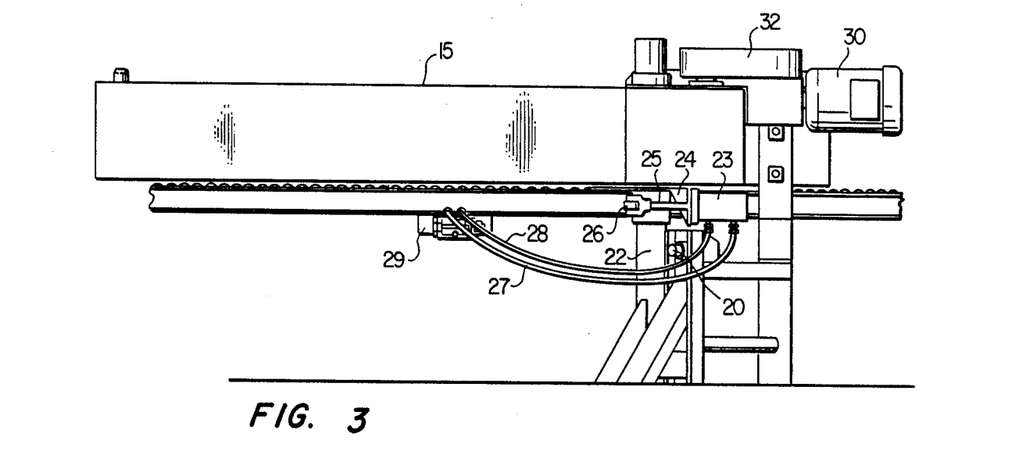
FIG. 3 is an elevational view of the back side of the diverter arm embodying the present invention.

Referring also to FIG. 3 diverter arm 15 pivots around shaft 22, which is fixed at its bottom end to a floor or other stationary decking. Diverter arm 15 is pivoted by the action of an air cylinder 23, which is fixedly attached to diverter arm 15 by means of an angle iron 24. Air cylinder 23 includes a shaft 25 and piston (not shown), which move in a reciprocal fashion in response to the introduction of air pressure on either side of the piston inside air cylinder 23. The reciprocating motion of shaft 25 causes air cylinder 23 to rotate about a clevis joint 26, thereby pivoting diverter arm 15 around shaft 22. A pair of spring-loaded stops 20 (one of which is shown in FIG. 3) are positioned on respective opposite sides of diverter arm 15 for damping the pivoting motion of diverter arm 15 and preventing diverter arm 15 from exceeding its rotational limits.

Figure 4:
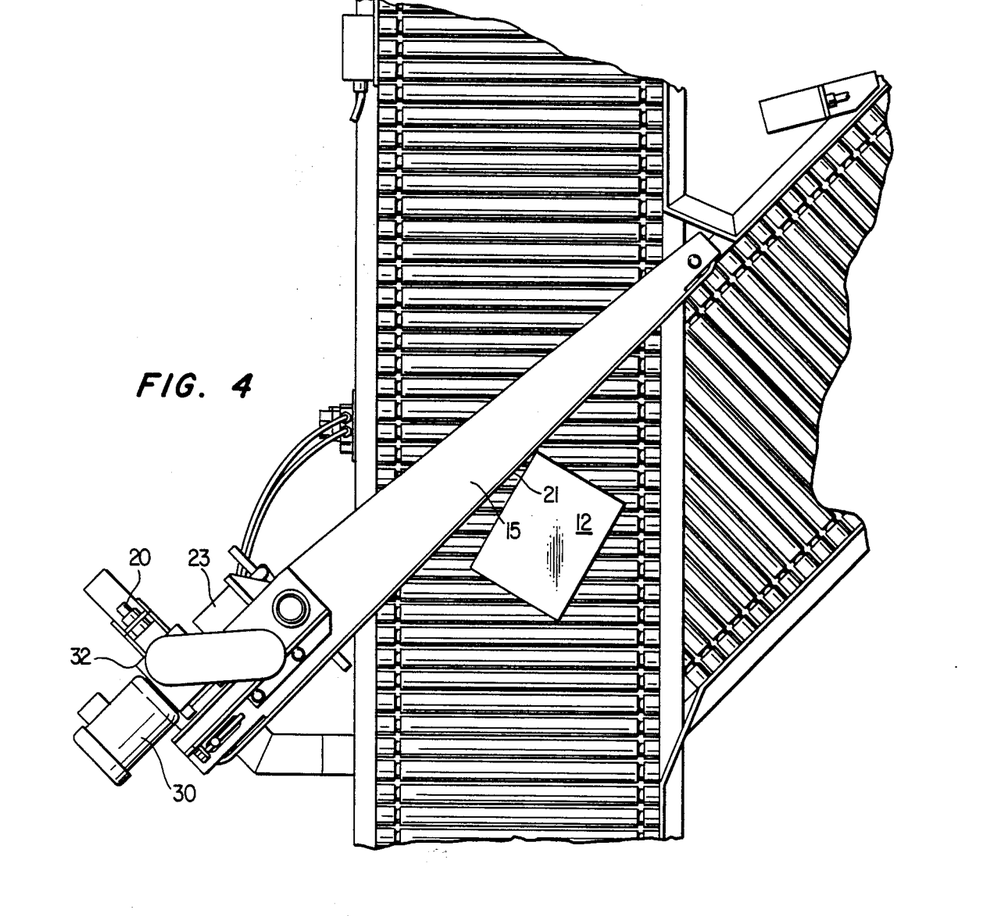
FIG. 4 is a top view of the diverter arm embodying the present invention, positioned to divert an article from the primary track to a secondary track in a article conveyor system.

When diverter arm 16 is in the "non-divert" or neutral position, as shown in FIG. 3 compressed air is shunted to air cylinder 23 via hose 27, which tends to move shaft 25 in the direction of clevis joint 26 and rotate diverter arm 15 counterclockwise when viewed from above. When an article 12 is to be diverted from primary track 11 to a secondary track 13, air is shunted to air cylinder 23 via air hose 28, which moves the piston and shaft 25 in a direction away from clevis joint 26, thereby rotating diverter arm 15 in a clockwise direction across primary track 11 to divert article 12 to secondary track 13, as shown in FIG. 4.

The supply of compressed air to air cylinder 23 is controlled by a solenoid 29, which is selectively activated by the control system. Each time solenoid 29 is activated by the control system, it shifts the supply of compressed air from one air hose to the other air hose, so that compressed air is shunted to the opposite side of the piston from that to which the air was being shunted prior to the solenoid's being activated. An electric motor 30 is attached to diverter arm 16 for driving continuous belt 21, which will be described in greater detail with respect to FIG. 5.

Figure 5:
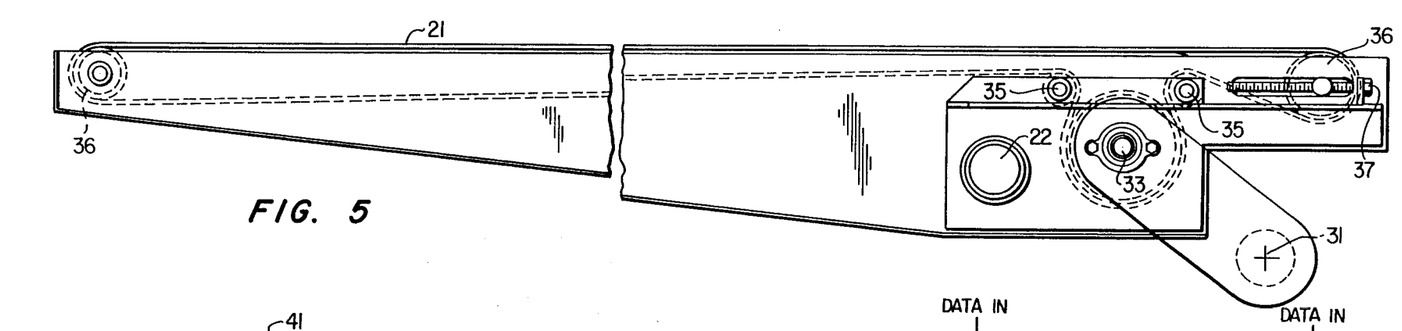
FIG. 5 is a top view of the diverter arm illustrating the major components thereof.

Referring to FIG. 5, the operation of continuous belt 21 will now be described in greater detail. Electric motor 30 turns a drive shaft 31 via reduction gear 32. Drive shaft 31 is connected by means of a conventional chain and sprocket arrangement (not shown) to a driven shaft 33, which rotates a drive drum 34 in a counterclockwise direction when viewed with reference to FIG. 5. Drive drum 34 is maintained in contact with continuous belt 21 along a substantial portion of the circumference of drive drum 34 by first and second snub rollers 35 to prevent slippage of continuous belt 21 along the circumference of drive drum 34. first and second take-up pulleys 36 are disposed at respective first and second ends of diverter arm 15 for maintaining proper tension on continuous belt 21 and for reversing the direction of continuous belt 21 at each end of diverter arm 15. To maintain the desired amount of tension on continuous belt 21, an adjusting screw 37 is provided for adjusting the separation between first and second take-up pulleys 36. When the conveyor system is in operation, continuous belt 21 on each diverter arm 15 is in constant operation, irrespective of whether diverter arm 15 is in a "divert" or "non-divert" position.

Figure 6:
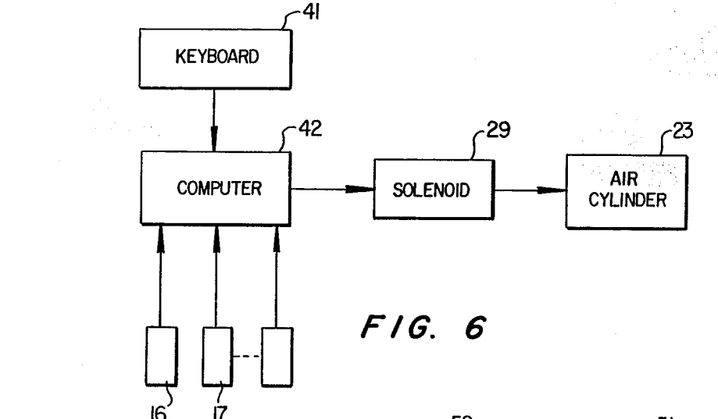
FIG. 6 is a block diagram of the control system of the article conveyor system of the present invention.

Referring to FIG. 6, a control system for controlling the operation of a conveyor system according to the present invention is depicted. The control system includes keyboard 41, by which the three digit zip code of the destination of each article 12 is entered into the control system. The information entered into the control system is received by and stored in a computer 42, which is preferably an industrial microcomputer of the Square D Model 300 type. Computer 42 also receives electrical signals from first and second photoelectric eyes 16 and 17, indicative of the relative positions of articles 12 on primary conveyor track 11 and on the respective secondary conveyor tracks 13 at any given time. Photoelectric eyes 16 and 17 are preferably industrial photoelectric eyes, manufactured and sold by Banner Corporation under Model No. SBLV1. When an article is to be diverted to a particular secondary track 13, computer 42 activates the solenoid 29 associated with the particular diverter arm 15 corresponding to that particular secondary track 13 to pivot diverter arm 15 across primary track 11 to divert the next article 12 in sequence to the selected secondary track 13. Diverter arm 15 remains in the "divert" position until solenoid 29 is again activated by computer 42.

Figure 7:
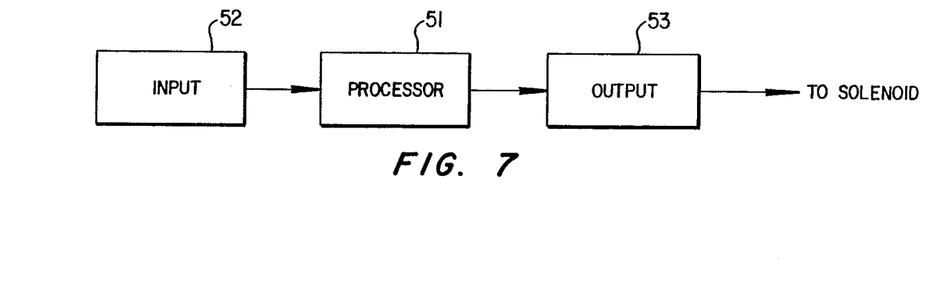
FIG. 7 is a block diagram of the components of the computing system of FIG. 6.

Referring to FIG. 7, computer 42 includes a microprocessor 51, an input unit 52 and an output unit 53. Input unit 52 is comprised of a plurality of input modules of the Square D Model DIM 101 type. Each individual input module receives electrical information signals from corresponding ones of the fist and second photoelectric eyes 16 and 17 and reduces the voltages thereof to a voltage compatible with the operation of microprocessor 51. Similarly, output unit 53 is comprised of a plurality of output modules of the Square D DOM 221 type. Each of the output modules corresponds to a one of the secondary tracks 13 for selectively activating the respective solenoids 29 associated therewith. Output unit 53 increases the voltage of the control signal from microprocessor 51 to a voltage compatible with the operation of solenoids 29. Computer 42 further includes a read-only memory in which is stored a permanent instruction set for controlling the operation of the article conveyor system and a random access memory in which is stored information received from keyboard 41 and photoelectric eyes 16 and 17.

Figures 8A, 8B:
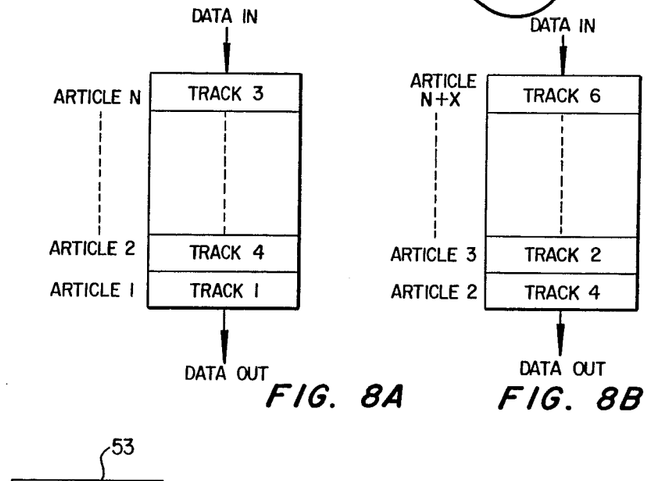
FIGS. 8A and 8B are memory map diagrams illustrating the sequence in which data is stored in the computing system memory.

Referring to FIGS. 8A and 8B, the sequence of storage of the data entered into the control system via keyboard 41 is depicted. Each sedoncary track 13 has associated therewith a discrete location in the random access memory. The data entered via keyboard 41 is stored in the sequence in which it is entered. Computer 42 converts the three digit zip code destinations entered into the control system to corresponding binary codes indicative of the particular secondary track 13 to which a particular article 12 is to be diverted. This coded information is inputted and stored in parallel substantially simultaneously in selected ones of a plurality of memory stacks, each of which is associated with a particular secondary track 13. Within each memory stack, the coded information is stored serially. Data is transferred in and out of the respective memory stacks on a first in, first out basis, so that in effect each secondary track 13 has associated therewith in the ramdom access memory a shift register in which the destination code of each article 12 is entered into and shifted out of the register in accordance with the movement of articles 12 along the conveyor system.

For example, in FIG. 8A, the memory stack associated with the first secondary track (determined with reference to the entry point of articles 12 on primary track 11) is depicted. The memory stack indicates that the first article in sequence (article 1) on primary track 11 to arrive at the first secondary track is to be diverted down that first secondary track as represented by a binary code "1" associated with article 1 in the memory stack. Therefore, computer 42 will activate the solenoid 29 associated with the diverter arm 15 corresponding to the first secondary track to move diverter arm 15 to a "divert" position so that article 1 will be diverted thereto. The memory stack indicates that the second article in sequence is to be diverted to the fourth secondary track as indicated by binary code "4" in the second stack location. When the photoelectric eyes 16 and 17 associated with the first secondary track indicate that article 1 has been diverted to the first secondary track, the binary code "1" corresponding to track 1 will shift out of the bottom of the stack and binary code "4" will shift to the bottom of the stack, whereupon computer 42 will determine that article 2 is not to be diverted to the first secondary track and will activate the corresponding solenoid 29 to move diverter arm 15 back to the "non-divert" position so that article 2 can pass unimpeded along primary track 11.

Referring also to FIG. 8B, the memory stack for the second secondary track is depicted. The memory stack for the second secondary track is different from that of the first secondary track in that the track codes for all articles 12 which are diverted to the first secondary track are not stored in the memory stack for the second secondary track or any succeeding secondary tracks because such articles will never arrive at the second secondary track or at any succeeding secondary tracks 13, having already been diverted to the first secondary track. Thus, the track code corresponding to article 2 is at the bottom of the memory stack corresponding to the second secondary track. Since article 2 is to be diverted to the fourth secondary track, computer 42 will position the diverter arm 15 associated with the second secondary track in a "non-divert" position to allow article 2 to pass unimpeded along primary track 11. When the first photoelectric detector 16 associated with the second secondary track indicates that article 2 has passed the second secondary track, the binary code "4" will drop out of the stack and the track code associated with article 3 (binary code "2") drops to the bottom of the memory stack, whereupon computer 42 will move the diverter arm 15 associated with the second secondary track to the "divert" position because the binary code "2" indicates that article 3 is to be diverted to the second secondary track.

Similarly, the respective memory stacks associated with the third, fourth and subsequent secondary tracks 13 will not include track codes for articles 12 which will have been diverted before arriving at the respective secondary tracks 13. It will be evident to one skilled in the art that the respective diverter arms 15 are operated asynchronously by computer 42, so that when the next article 12 to arrive at a particular secondary track 13 is to be diverted to that secondary track 13, computer 42 will move the corresponding diverter arm 15 to the divert position, irrespective of the actual position of that package on the primary conveyor track. It will also be evident to one skilled in the art that because fewer packages are likely to arrive at the secondary tracks which are the farthest downstream along the primary track, the respective memory stacks associated with those downstream secondary tracks need not contain as many destination codes as the upstream tracks. For example, in FIGS. 8A and 8B, if the respective memory stacks are large enough to contain destination codes for N number of articles, the memory stack associated with the first secondary track will contain N destination codes for articles 1 through N. On the other hand, the memory stack for the second secondary track may also contain N destination codes, but for selected articles beginning with article 2 to article N+X, where X is the number of articles in the sequence of articles 1 through N+X placed on primary track 11 which will be diverted to the first secondary track and hence will never arrive at the second secondary track. Therefore, unnecessary information is not entered into the respective memory stacks and the respective diverter arms 15 associated with the downstream secondary tracks 13 can be properly positioned substantially in advance of the arrival of individual articles 12.

Figure 9:
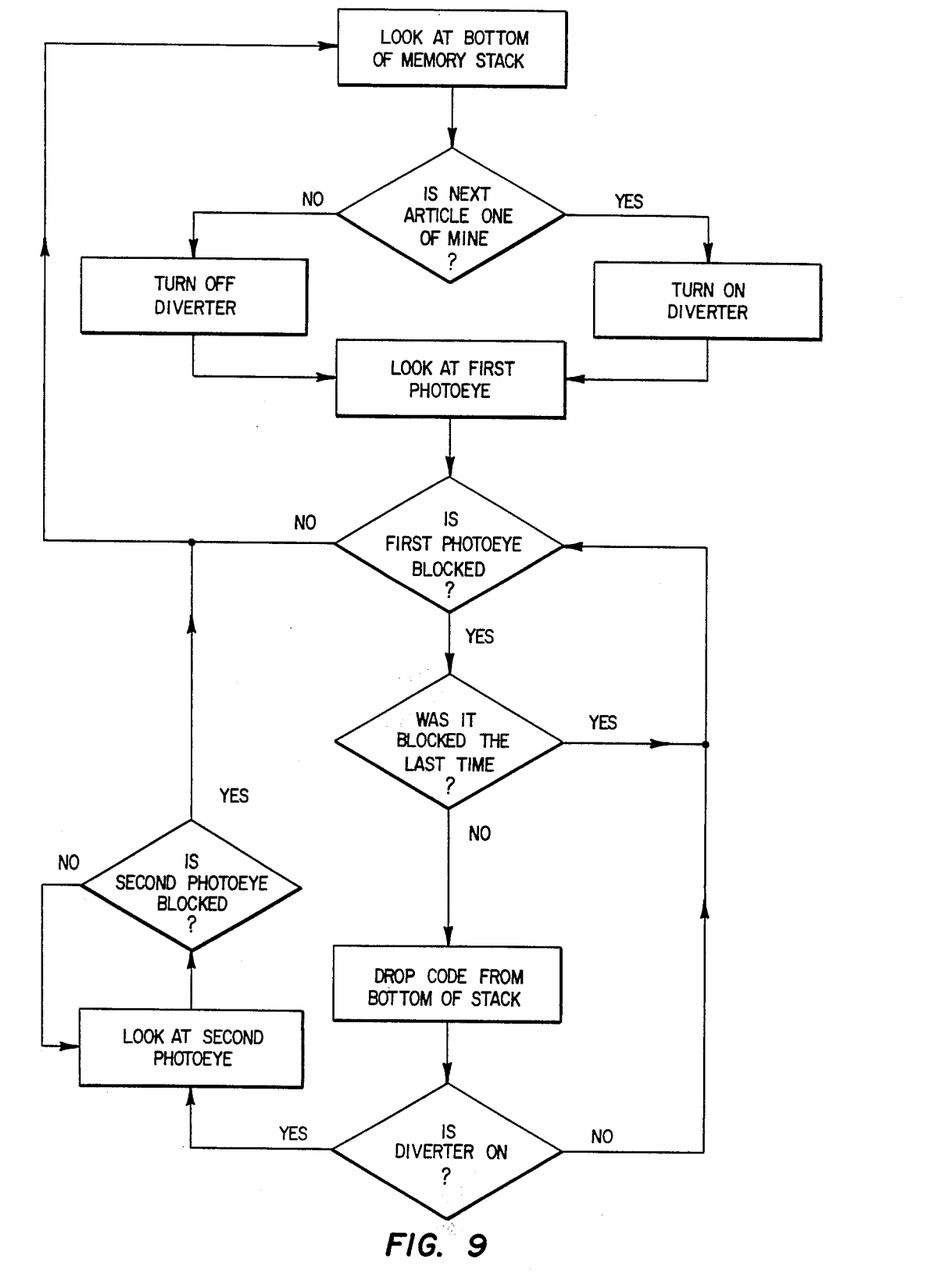
FIG. 9 is a flow diagram describing the sequence of operation of the computing system in controlling the operation of the individual diverter arms of the article conveyor system.

Referring to FIG. 9, the operation of the control program stored in the read-only memory in computer 42 is depicted in greater detail. Each individual diverter arm 15 is controlled in accordance with the sequence of steps outlined in FIG. 9. Computer 42 addresses the memory stack associated with a particular secondary track 13 and looks at the track code stored at the bottom of the stack, which represents the destination of the next article 12 in sequence to arrive at that particular secondary track 13. If the track code for the next article 12 in sequence to arrive at a particular secondary track 13 corresponds to that secondary track 13, computer 42 activates diverter arm 15 to divert that particular article 12 to that secondary track 13. If, on the other hand, the track code for the next article 12 in sequence to arrive at a secondary track 13 does not correspond to that particular secondary track 13, diverter arm 15 will be turned off and remain in the neutral position, to allow the next article 12 in sequence to proceed unimpeded along primary track 11.

To keep track of the relative locations and movement of articles 12 on the conveyor system, computer 42 continually scans the first and second photoelectric eyes 16 approximately every 30 milliseconds. If a first photoelectric eye 16 is blocked, indicating that an article 12 is passing in front of it, computer 42 will go back and determine whether first photoelectric eye 16 was blocked the last time it was scanned. If the first photoelectric eye 16 was not blocked the last time computer 42 looked at it, this indicates that an article 12 is beginning to pass along primary track 11 in the vicinity of the first photoelectric eye 16, whereupon the track code at the bottom of the memory stack is shifted out of the memory stack. If diverter arm 15 has been activated in accordance with the sequence of steps set forth above, computer 42 will scan the corresponding second photoelectric eye 17, located on the corresponding secondary track 13, and will continue to scan second photoelectric eye 17 until second photoelectric eye 17 becomes blocked, indicating that the article 12 is passing in front of the second photoelectric eye 17 and has been diverted to the corresponding secondary track 13. Computer 42 will then address the system memory and look at the next track code in sequence at the bottom of the memory stack and the aforementioned procedure is repeated with respect to the next track code in sequence in the memory stack.

If, on the other hand, diverter arm 15 has not been activated to divert the next article 12 in sequence, after the track code at the bottom of the memory stack is shifted out of the stack, computer 42 will continue to scan the first photoelectric eye 16 until the first photoelectric eye is no longer blocked, which indicates that article 12 has passed by first photoelectric eye 16 on primary track 11. Computer 42 then branches back to the beginning of the sequence of steps depicted in FIG. 9 and addresses the memory to determine the next track code in sequence at the bottom of the memory stack and the aforementioned steps are repeated with respect to the next track code.

Various embodiments of the invention have now been described in detail. Since it is obvious that many changes and modifications can be made in the above details without parting from the nature and spirit of the invention, it is understood that the invention is not to be limited to said details, except as set forth in the appended claims.

What is claimed is:

1. A control system for an article conveyor, said article conveyor having a primary track on which articles are initially loaded, a plurality of secondary tracks intersecting the primary track at selected locations therealong and diverter means associated with each of said secondary tracks for diverting articles to respective ones of said secondary tracks, said control system comprising:

means for entering into said control system track information for each article corresponding to the particular secondary track to which each article is to be diverted;

means for inputting and storing said track information for each article in parallel substantially simultaneously at selected ones of a plurality of discrete locations in said storage means, each of said discrete locations being associated with a corresponding one of said secondary tracks so that track information for each article on the primary track is stored in parallel substantially simultaneously in only those discrete locations which are associated with the particular secondary track down which the article will be diverted and those secondary tracks which intersect the primary track upstream of the particular secondary track down which the article will be diverted and each discrete location has stored therein track information for those articles which will arrive at the corresponding secondary track in a sequence corresponding to the sequence in which said articles will arrive at the corresponding secondary track;

detector means positioned in proximity to respective ones of said diverter means at selected locations along said primary track for detecting the presence of articles at said selected locations and for generating respective electrical signals indicative thereof, each of said detector means being associated with a corresponding one of said diverter means and said secondary tracks;

means for comparing track information for the article which will be first to arrive at each secondary track with the identity of that particular secondary track; and means responsive to said electrical signals generated by said detector means for selectively operating the diverter means to position each of the diverter means to divert said first article to arrive at the corresponding secondary track to the corresponding secondary track when the track information for said first article matches the identity of the corresponding secondary track, irrespective of the actual location of said first article on said primary track, and alternatively to position each of the diverter means to allow said first article to continue along the primary track when the track information for said first article does not match the identity of the corresponding secondary track.

2. The control system according to claim 1 wherein said means for entering information into said control system is comprised of a keyboard having a plurality of user-activatable keys.

3. The control system according to claim 2 wherein said article conveyor is a mail conveyor for transporting parcels and sacks of mail of various sizes and shapes and said track information is comprised of a code corresponding to the the postal zip code of the destination of each such parcel and sack of mail, said track information being entered into said control system via said keyboard means, each of said plurality of secondary tracks corresponding to at least one of said codes.

4. The control system according to claim 1 wherein each of said discrete locations in said storage means is comprised of shift register means, said track information being stored in each of said shift register means in a sequence corresponding to the sequence in which articles will arrive at the corresponding secondary track, said track information being shifted sequentially in each of said shift register means in accordance with the sequence at which articles arrive at the corresponding secondary tracks so that track information corresponding to the first article to arrive at each secondary track is shifted out of the register upon arrival of the article at the particular secondary track.

5. The control system according to claim 1 wherein said detector means is comprised of first and second sets of photoelectric eyes, said first set of photoelectric eyes being positioned at selected locations along said primary track and adjacent to respective ones of said diverter arms for detecting the presence of articles at said selected locations on the primary track and for generating first electrical signals indiative thereof, and said second set of photoelectric eyes being positioned at selected locations on respective secondary tracks for detecting the presence of articles at said selected locations on the respective secondary tracks and for generating second electrical signals indicative thereof to confirm that selected articles have been diverted to the respective secondary tracks, the diverter means associated with those secondary tracks to which articles are being diverted remaining in a position to divert articles to the corresponding secondary tracks until corresponding second electrical signals are generated, each of said diverter means being positioned to divert the first article to arrive at the corresponding secondary track prior to detection of said first article by the particular one of said first set of photoelectric eyes which is associated with the corresponding diverter means when track information for said first article matches the identity of the particular secondary track.

6. The control system according to claim 1 wherein said detector means includes first and second detector means, said first detector means being positioned at selected locations along said primary track and adjacent to respective ones of said diverter arms for detecting the presence of articles at said selected locations on the primary track and for generating first electrical signals indicative thereof, said second detector means being positioned at selected locations on respective secondary tracks for detecting the presence of articles at said selected locations on the respective secondary tracks and for generating second electrical signals indicative thereof to confirm that selected articles have been diverted to the respective secondary tracks, the diverter means associated with those secondary tracks to which articles are being diverted remaining in a position to divert articles to the corresponding secondary tracks until corresponding second electrical signals are generated, each of said diverter means being positioned to divert the first article to arrive at the corresponding secondary track prior to detection of said first article by the first detector means when track information for said first article matches the identity of the particular secondary track.

7. A conveyor system for transporting and sorting articles, comprising:
  a primary conveyor track on which said articles are placed for transport and sorting;
  a plurality of secondary conveyor tracks intersecting the primary conveyor track at selected locations therealong;
  a plurality of diverter means mounted adjacent to respective ones of said secondary conveyor tracks for diverting selected ones of said articles from the primary conveyor track to corresponding selected ones of said secondary conveyor tracks; and
  control means for automatically operating said diverter means to divert selected ones of said articles to said corresponding selected secondary conveyor tracks and to allow other ones of said articles to continue along said primary conveyor track, said control means comprising:
  means for entering into said control means track information for each article corresponding to the particular secondary conveyor track to which each article is to be diverted;
  means for inputting and storing said track information for each article in parallel substantially simultaneously at selected ones of a plurality of discrete locations in said storage means, each of said discrete locations being associated with a correspond one of said secondary conveyor tracks, so that track information for each article on the primary conveyor track is stored in parallel substantially simultaneously in only those discrete locations which are associated with the particular secondary conveyor track down which the article will be diverted and those secondary conveyor tracks which intersect the primary conveyor track upstream of that particular secondary conveyor track, each discrete location having stored therein track information for those articles which will arrive at the corresponding secondary conveyor track in a sequence corresponding to the sequence in which said articles will arrive at the corresponding secondary conveyor track;
  detector means positioned at selected locations along said primary track in proximity to respective ones of said diverter means for detecting the presence of articles at said selected locations and for generating respective electrical signals indicative thereof, each of said detector means being associated with a corresponding one of said diverter means and said secondary tracks;
  means for comparing track information for the article which will be first to arrive at each secondary track with the identity of that particular secondary track; and
  means responsive to said electrical signals generated by said detector means for selectively operating the diverter means to position each of the diverter means to divert said first article to arrive at the corresponding secondary track to the corresponding secondary track when the track information for said article matches the identity of the corresponding secondary track, irrespective of the actual location of said first article on the primary track, and for selectively operating the respective diverter means to position each of the diverter arms to allow said first article to continue along the primary track when the track information for said first article does not match the identity of the corresponding secondary track.

8. The conveyor system according to claim 7 wherein said plurality of diverter means is comprised of a corresponding plurality of diverter arms which are pivotably mounted adjacent to respective ones of said secondary conveyor tracks, each of said arms having a movable contact surface for deflecting selected ones of said articles from the primary track to corresponding selected ones of said secondary conveyor tracks, said contact surface including at least a portion of a continuous belt which is movable along the longitudinal axis of the corresponding arm in a direction in which the articles are deflected, the lowermost edge of the continuous belt being positioned sufficiently close to the primary track to prevent said articles from being trapped between said lowermost edge and the primary track.

9. A method of sorting articles in a conveyor system having a primary track on which articles are initially loaded, a plurality of secondary tracks intersecting the primary track at selected locations therealong and a plurality of diverter means, each of which is associated with a corresponding one of said plurality of secondary tracks, for diverting selected ones of said articles to the respective secondary tracks, said method comprising the steps of:
  entering track information into said conveyor system for each article on the primary track corresponding to the particular secondary track to which each article is to be diverted;
  providing storage means having discrete locations therein for storing track information;
  assingning one of said discrete locations in said storage means to a corresponding one of said secondary tracks;
  inputting and storing said track information for each article in parallel substantially simultaneously at selected ones of said discrete locations in said storage means so that track information for each article is stored in parallel substantially simultaneously in only those discrete locations which are associated with the particular secondary track down which the article will be diverted and those secondary tracks which intersect the primary track upstream of the particular secondary track down which the article will be diverted and each discrete location has stored therein track information for those articles which will arrive at the corresponding secondary track in a sequence corresponding to the sequence in which said articles will arrive at the corresponding secondary track;
  detecting the presence of articles at selected locations along the primary track and generating respective electrical signals indicative thereof, said selected locations being in proximity to respective ones of said diverter means so that each of said detector means is associated with a corresponding one of said diverter means and said secondary tracks;
  comparing track information for the article which will be first to arrive at each secondary track with the identity of that particular secondary track; and
  selectively operating the diverter means in response to said electrical signals to position each of the diverter means to divert said first article to arrive at the corresponding secondary track to the corresponding secondary track when the track information for said first article matches the identity of the corresponding secondary track, irrespective of the actual location of said first article on said primary track, and alternatively to position each of the diverter means to allow said first article to continue along the primary track when the track information for said first article does not match the identity of the corresponding secondary track.

* * * * *